Nov. 19, 1929.   P. J. LYBACK   1,735,929
TRACTOR
Filed July 31, 1918   5 Sheets-Sheet 1

Nov. 19, 1929.   P. J. LYBACK   1,735,929
TRACTOR
Filed July 31, 1918   5 Sheets-Sheet 3

WITNESSES:

INVENTOR.
Peter Jacob Lyback
BY
ATTORNEY

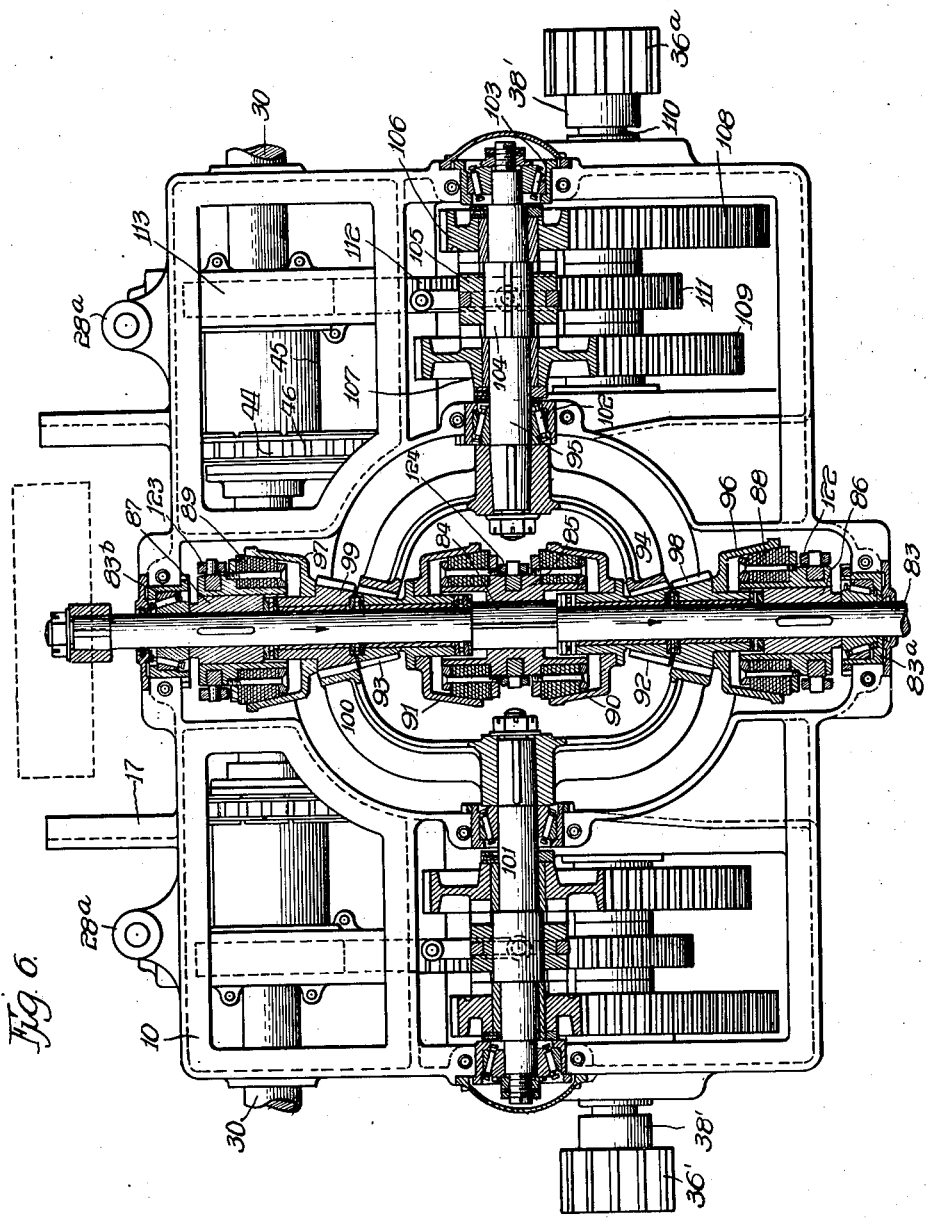

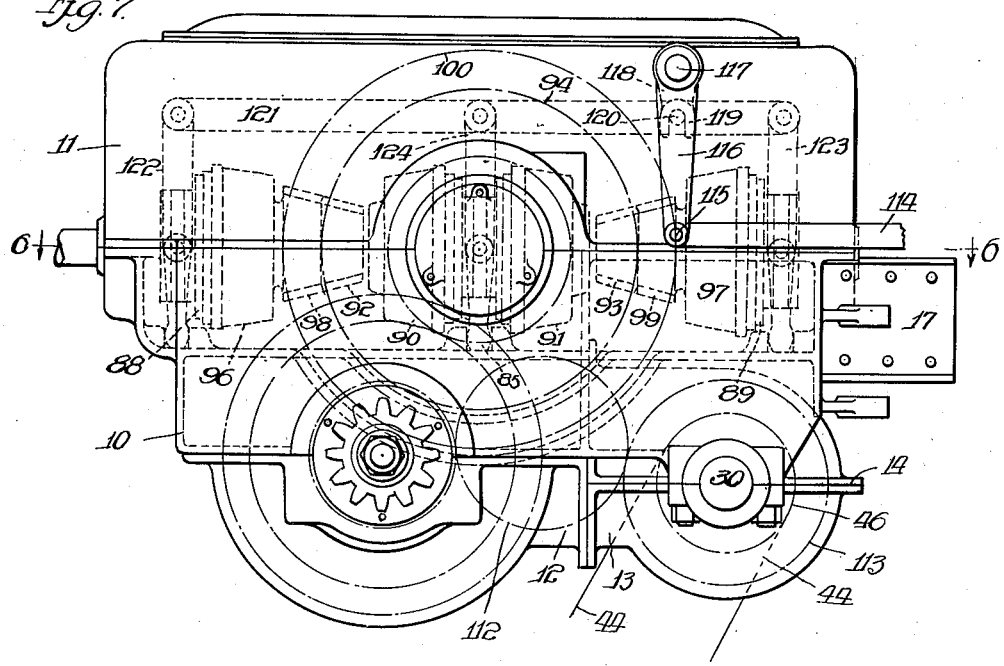

Patented Nov. 19, 1929

1,735,929

UNITED STATES PATENT OFFICE

PETER JACOB LYBACK, OF CHICAGO, ILLINOIS

TRACTOR

Application filed July 31, 1918. Serial No. 247,603.

My present invention relates in general to automotive vehicles, and more particularly to vehicles used for traction purposes and has special reference to the provision of an improved form of vehicle adapted for work on uneven or soft ground.

The principal objects of my present invention are broadly the provision of improved steering and driving means, and the provision of a structure of the nature referred to, characterized by the provision in one machine of propelling means including both traction wheel elements and that form of self-contained flexible traction mechanism commonly termed a continuous flexible tread drive; more specifically the provision of means whereby the said two several means of propulsion may be independently, alternately, or concurrently brought into action; the provision of an improved form of turning mechanism whereby the tractor may be turned about to any desired degree on a minimum radius; the provision of improved vehicle steering mechanism adapted for a variable tread and also adapted for either manual or power driven actuation; the provision of an improved four-wheeled vehicle of the kind referred to, characterized by the provision of means for permitting vertical movement of the members of one of the pairs of wheels whereby, not only inequalities of the ground are compensated for, but also the machine is adapted freely to operate with certain of its wheels on one level and other of its wheels on another level; the provision of improved driving mechanism for automotive vehicles characterized by the employment of means whereby both of the driving wheels may be driven in the same direction, and either forward or backward, such driving wheels may also be driven in opposite directions, or one wheel may be driven more rapidly than another, which may be driven in the same direction or in the opposite direction at a lower rate of speed, or one wheel may be held stationary and the other wheel driven in either direction; the provision of an improved form of driving wheel for automotive vehicles; the provision of an improved form of draft gear and draw-bar construction for prime movers whereby the angularity of the tractive effort exerted on the trailer or plows or other implements drawn by the tractor may be varied and thereby the depth of the bite of the latter may be raised or lowered as circumstances may require; the provision of an improved arrangement of the relation between the draw-bar and the continuous flexible tread elements whereby the tractive stress imposed upon the draw-bar acts to add to the traction of the continuous flexible tread upon the ground; the provision of means whereby such action last referred to may be varied at will; the provision of an improved duplex drive for tractors wherein one side of the vehicle may be propelled by a traction wheel and the other side may be propelled independently by the so-called continuous flexible tread drive either in the same or in an opposite direction; the provision of a duplex drive for tractors characterized by the provision on each side of the vehicle of a tractor wheel and a continuous flexible tread drive, the drives on the two sides of the vehicle being independent of each other, and the two driving elements on the given side of the vehicle being alternately or concurrently operable in the same or opposite directions; the provision of an improved form of traction wheel; the provision of an improved form of continuous flexible tread drive; the provision of an improved form of variable draft arrangement; together with certain other objects to be hereinafter more specifically pointed out.

In attaining the objects referred to, together with certain additional benefits and advantages to be hereinafter disclosed, I have provided a construction one embodiment of which is shown in the accompanying drawings wherein—

Figure 6 is a central sectional plan view of the driving mechanism, the housing of which is indicated at 6 in Figure 1, the present figure being on the line 6—6 of Figure 7;

Figure 7 is a side elevational view illustrative of the relation of certain of the parts shown in Figure 6;

Figure 8 is a fragmental plan view of the draw-bar construction; and

Figure 9 is an elevational view of the device shown in Figure 8, the continuous flexible tread device, and certain mechanism employed for elevating and lowering it, being indicated diagrammatically.

Figure 1:
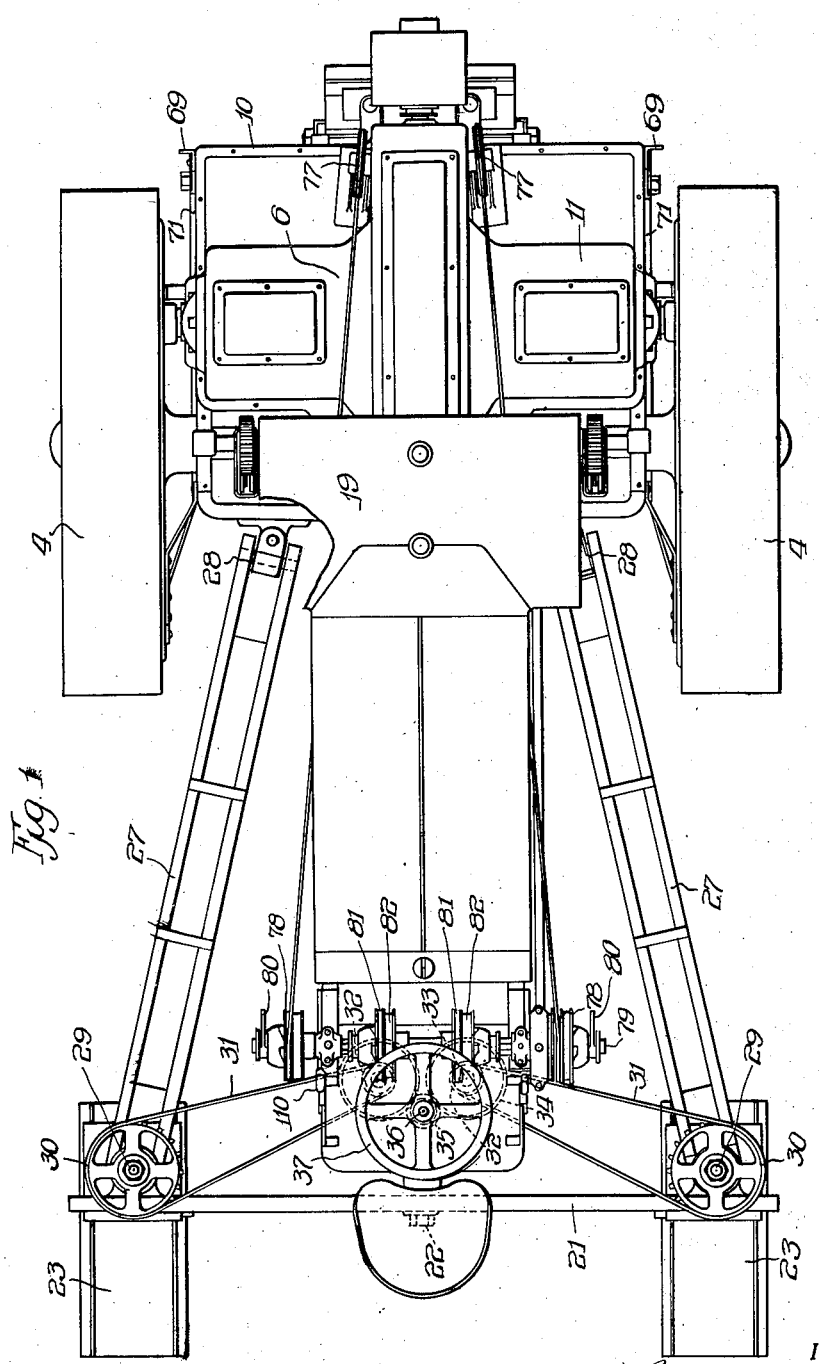
Figure 1 is a plan view illustrative of a tractor embodying my present improvements.
Figure 2:
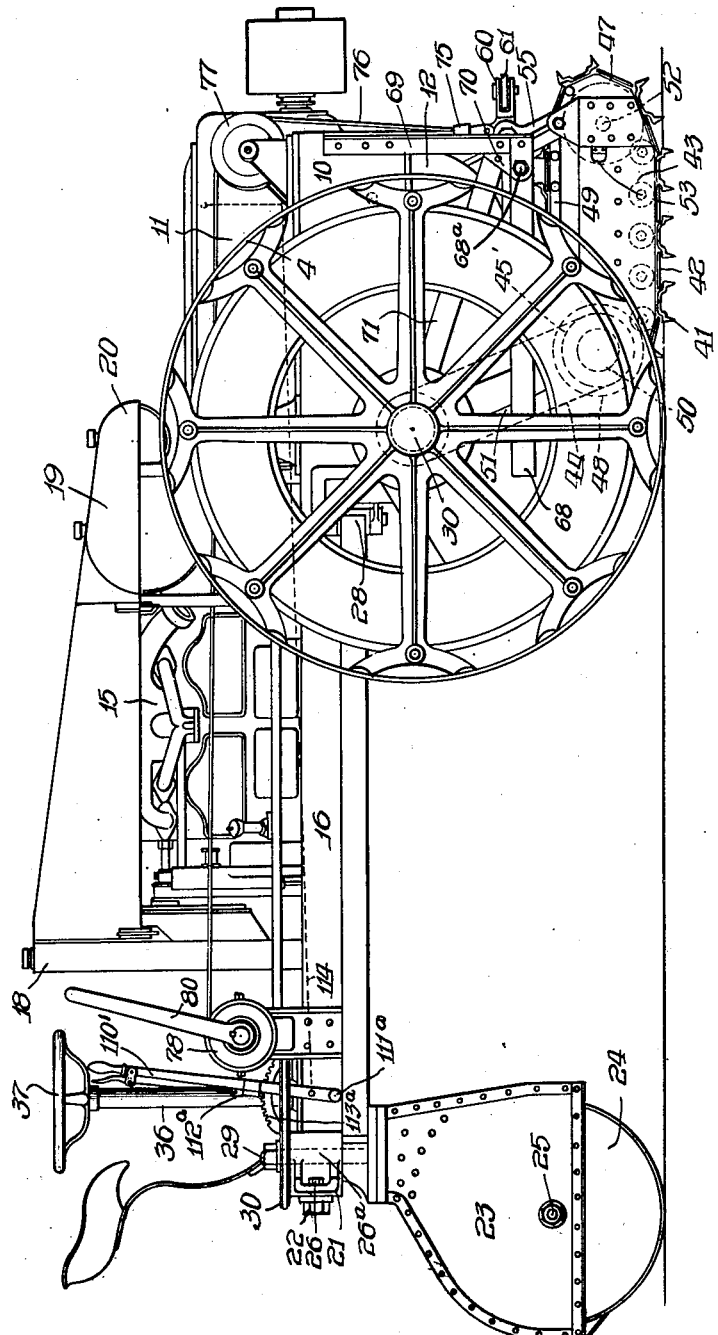
Figure 2 is a side elevational view of the structure of Figure 1.

Referring first, more particularly to Figures 1 and 2, it will be observed that in building the structure here shown I preferably employ a main casting indicated at 10, provided with a top-piece or cover 11, which, together with a bottom-piece formed in parts 12, 13 and 14, forms a dust proof housing for encasing the driving gear of Figure 6 and preserving it from the deleterious effects of the weather and the accidental entry of foreign matter.

For supporting the motor 15 I preferably employ a U-frame 16, the ends of which are attached to the member 10 by means of brackets 17, more clearly to be seen in Figures 6 and 7. The frame 16 also supports the radiator 18 and the usual fuel oil supply tanks 19 and 20.

The rear end of the structure just described is pivotally supported by a transverse frame member 21, which may conveniently be in the form of a channel or other commercial beam contour, pivoted as indicated at 22 to the outer end of the frame 16 whereby a true three point support for the motor is given, even though four wheels are employed in the tractor structure.

Referring more particularly to the steering mechanism, it will be noted that at each end of the beam 21 is provided a hood 23 wherein is mounted a wheel 24 supported by an axle 25 passing through the hood. These hoods are arranged for movement about a vertical axis and relatively to the beam 21 in a manner to be hereinafter more fully described, by journal boxes 26ª carrying hood spindles. The boxes 26ª are mounted for longitudinal movement along the beam 21 by means of the bolts 26, which pass through apertures in the beam 21. The hoods are held in predetermined relation to the rest of the machine and prevented from movement relatively to the longitudinal axis of the machine by means of the beam 27, which may conveniently be of box-girder construction as shown, such girders having connection to the frame member 10 by means of universal joints, one of which is indicated at 28 in Figure 2. The universal joints engage the frame member 10 by means of the lugs indicated at 28ª. Compensation for the variation in the length of the beam is attained by means of a plurality of holes or a slot in the ends of the beam members as may be convenient. As will be evident on inspection of the drawings, the construction just described provides for both vertical and longitudinal movement of the wheels 24, relatively to the forward end of the tractor, according to the conditions met in the operation of the machine.

A caster effect is given to the wheel 24 by the provision on the hood 23 of a spindle 29. For turning the hoods 23 and thence the wheels 24, I mount upon the spindle 29 a sprocket 30 connected by a chain 31 to a sprocket pinion 32 which is mounted on a vertical shaft 33 on the lower end whereof is carried a gear 34, which is driven by a pinion 35 on the steering shaft 36. The steering shaft 36 may be operated by a steering wheel 37.

Figure 3:
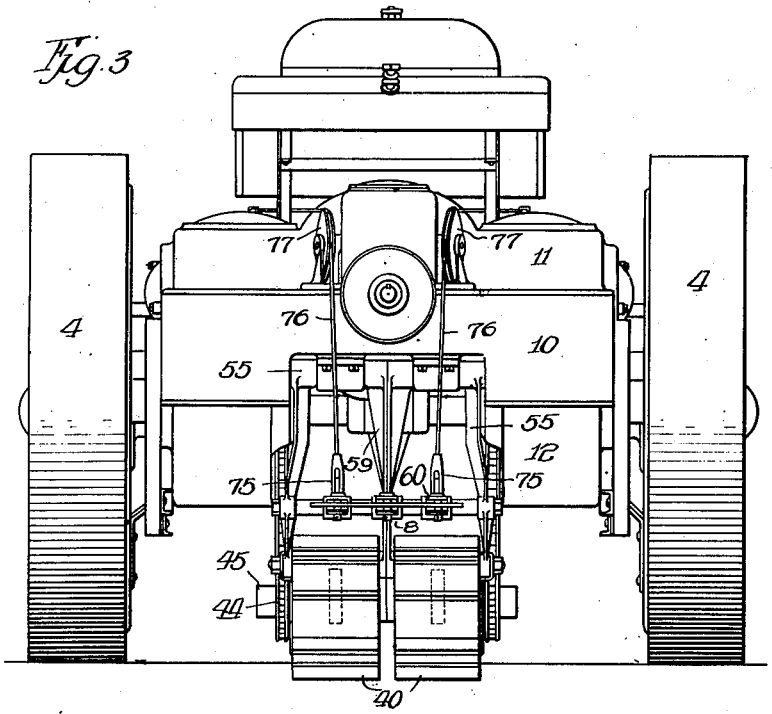
Figure 3 is an end elevational view thereof, viewing the structure from the aspect of the right-hand end of Figure 1.
Figure 4:
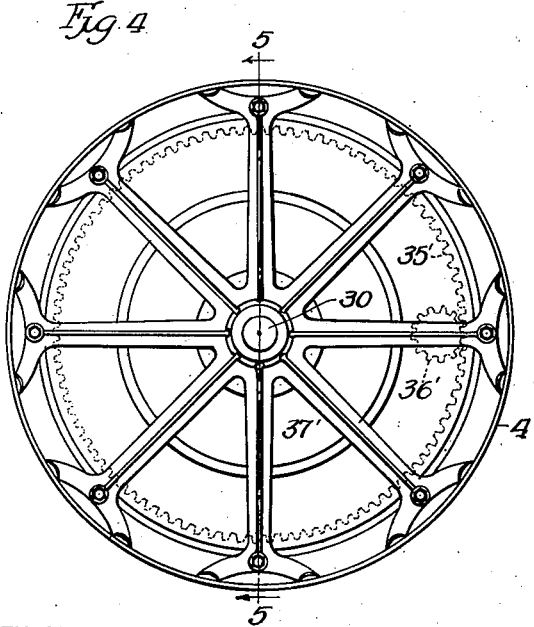
Figure 4 is an elevational view illustrative of a preferred form of construction of the driving wheels indicated at 4 in Figures 1, 2 and 3.
Figure 5:
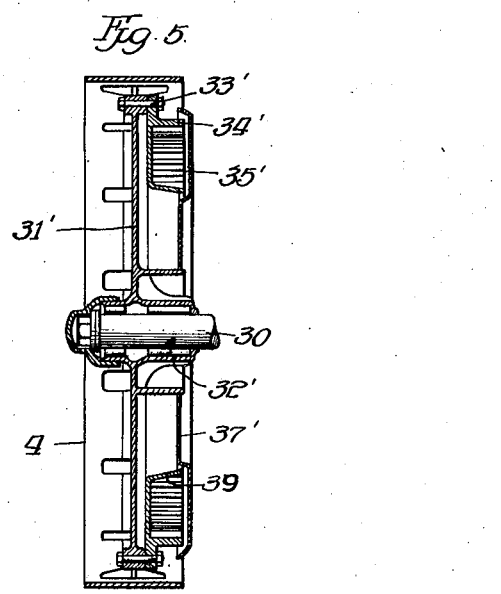
Figure 5 is a central transverse sectional view of the wheel of Figure 4, taken on the line 5—5 of such figure.

Referring now to the driving mechanism and more particularly to Figures 2 and 3, it will be observed that at the front end of the machine I provide a pair of traction wheels 4 mounted on a dead axle 30, which supports the frame member 10 and associated parts. The construction of these wheels, as will be seen on inspection of Figures 4 and 5, preferably includes a cast steel spider 31' having a hub 32' between which hub and the axle 30, a suitable anti-friction roller bearing, such as one of the well-known Hyatt type, may conveniently be interposed. To the spider is secured, in some suitable manner, as by the bolts 33', an internal gear ring 34' whose teeth 35' are engaged by a driving pinion 36' (see Figure 6), dust guards being employed to save the gear teeth 35' as far as possible from contact with foreign matter. The dust guard member 37' is preferably made in homologous halves so as to embrace the hub 38' of the pinion 36', and the axle 30, with the smallest practicable amount of opening, and caused to approximate the gear ring 34' and the inwardly extending flange 39.

Between the wheels 4 I arrange the continuous flexible tread drive elements indicated at 40. These each include the customary flexible "crawler" or tread member 41 provided with angularly disposed projections for gripping the soil, intermediate plates 42, being interposed between the elements 41 for forming an endless band within which are mounted rollers 43 to hold the band in contact with the ground while it is driven by chain 44 engaging the sprocket whose hub is indicated at 45, such chain being driven from a sprocket 46 (see Figures 6 and 7) mounted on shaft 30. At each end of the endless band structure, including the members 41 and 42, are mounted the usual sprockets 47 and 48 a chain 49 being trained over said sprockets and carrying the members 41 and 42.

Referring now more particularly to Figures 2 and 3, it will be observed that the sprocket 45' is carried on a shaft 50, which is supported by links 51 carried by the shaft 30 and that the sprocket 47 is supported on a shaft 52 provided with a bearing adjustable by means of adjusting screws, one of which is indicated at 53. The forward end of the crawler is supported by means of the pair of links 55 whose upper ends 56 are secured to the frame 10.

Referring now to the draft mechanism and more particularly to Figures 2, 8 and 9, it will be observed that the two shafts 50$^a$ are connected by means of clevises 60 to an equalizing bar 61, which in turn is connected by the clevis 62 to the draw-bar 63. This draw-bar 63 is preferably made in the form of a loop to accommodate the adjacent units of the pairs of links 51 and 55, which are disposed within such loop. The draw-bar 63 has engagement with the transverse draft members 64 and 65 by means of a link 66 attached to the clevis 67. The transverse members 64 and 65 are in turn attached at their outer ends to longitudinal draft members 68, which are pivotally carried by the vertical frame members 69, as indicated at 68$^a$ in Figure 2. The draft members 68 serve to fulcrum the levers 64 and 65 and said members 68 must be pivoted to permit the front ends of the tread devices to be lifted when the cables 76 are pulled. Gusset plates are employed as indicated at 70, to strengthen the connection between the members 68 and 69 and also to support a diagonally disposed strut 71 which is employed to take up part of the strain which would otherwise be placed directly upon the members 69. The structure just described serves to utilize the resistance of the plows acting upon the rear end of the draw bar 63, by virtue of the connection of the plows to the lever 64 to force the continuous flexible tread more firmly against the traction surface, and this may be varied as desired by using different ones of the holes indicated at 64$^a$ and 65$^a$. The plows pulling on bar 63, and the pivotal links 51 and 55 cause the tread device to descend and this permits the obtainment of a relatively greater tractive effort with a relatively lighter weight of machine than would otherwise be possible.

The draw-bar 63 is also slotted horizontally as indicated at 50$^b$ to permit movement of the shafts 50$^a$ as the links 51 and 55 vary their relation when the continuous flexible tread devices are raised.

For lifting the continuous flexible tread structures just described out of the ground and from their position shown in Figure 2 of the drawings, in each case a clevis 75 engaging the clevis 60 is provided with a flexible connection, such as a wire rope or chain, indicated at 76, and passing over sheaves 77 and 78, and fixed to the sheaves 78. The sheave 78 is non-rotatably mounted on a shaft 79 on which is also mounted a hand lever 80. At 81 and 82 are conventionally located the sheave and brake band operable by suitable hand levers for lifting and holding up the plows (not shown).

Referring now further to the driving mechanism and more particularly to Figures 6 and 7 of the drawing, it will be observed that at 83 is shown the main driving shaft supported by bearings indicated at 83$^a$ and 83$^b$ driven by the motor conventionally indicated at 15. On this driving shaft 83 is provided a squared portion 84 carrying a double ended male cone clutch member 85 centrally disposed thereon. Said shaft 83 is also provided with squared portions 86 and 87 upon which are mounted male cone clutch members 88 and 89.

The clutch member 85 is adapted for alternate engagements with female clutch members 90 and 91, which are provided with pinions 92 and 93. The pinions 92 and 93 engage a gear 94, which is mounted on and drives a shaft 95.

The clutch members 88 and 89 are adapted to engage female clutch members 96 and 97, which drive pinions 98 and 99, which in turn, drive a gear 100 mounted on a shaft 101.

The shaft 95 is supported at its opposite ends by suitable bearings 102 and 103. On the shaft 95 there is provided a squared portion 104 carrying a jaw clutch member 105 provided with teeth on each side whereby such member 105 is adapted for alternate engagement with gear wheels 106 and 107, in turn driving gears 108 and 109 non-rotatably mounted on the counter-shaft 110, which latter carries the pinion 36$^a$ and drives one of the wheels 4.

A gear 111, also non-rotatably mounted on the counter-shaft 110, drives an idler gear 112 (see Figure 7), which in turn drives a gear 113 mounted on a sleeve 45 which forms part of the gear 44 on the shaft 30 for driving the continuous flexible tread elements.

The gearing and other elements operated by the shaft 101 for driving the pinion 36' being precisely the converse of those operated by the shaft 95, no particularized description thereof is deemed necessary.

For the operation of the clutches in causing the machine to move backward and forward, and for varying the speed of motion, I employ hand levers, one indicated at 110', pivoted at 111$^a$ and having a latch 112$^a$ engaging a quadrant 113$^a$.

A shifting bar 114 is pivotally connected at 115 to a link 116, which in turn, is non-rotatably mounted on a shaft 117 carried by the housing member 11. On the shaft 117 is mounted a rocker arm 118 having a bifurcated portion 119 engaging a pin 120 on a shifting rod 121 to which rod are pivoted clutch levers 122 and 123 engaging respectively the clutch members 88 and 89.

For operating the central clutch 85 a second lever construction, similar to that indicated at 110′, with a shifting bar and associated parts similar to those just described, is attached to the clutch lever 124.

In the operation of a vehicle embodying my present invention, when it is desired to move the vehicle forward both of the hand levers, one of which is indicated at 110′, are moved forward, that is to the right of the position shown in Figure 1 of the drawing, thereby sliding the clutch elements 89 and 85 forward, that is in the direction indicated by the arrows in Figure 6 of the drawing, which causes the train of gearing, including the members 90, 92, 94, 95 and 97, 99, 100 and 101 to be set in motion, thus driving the pinions 36′ and 36ª in the same direction.

If, however, it is desired to move but one of the wheels, only one of the said levers is moved.

If it is desired to move one of the wheels forward and the other wheel backward, one of the hand levers is moved in one direction and the other in the other direction.

If it is desired to move both of the wheels backward, both of the hand levers are drawn toward the operator.

Inasmuch as each continuous flexible tread drive moves concurrently with the corresponding tractor wheel, either continuous flexible tread drive may, as desired, be dropped into an engagement with the ground by manipulation of the corresponding lever, one of which is indicated at 80.

Obviously in making the turns, it is preferable, where expedient, that the turns be made by means of tractor wheels rather than the continuous flexible tread structures in order avoid placing undue strains on the crawler mechanism.

On comparison of Figures 2, 8 and 9, it will be understood that by utilization of different ones of the holes 64ª and 65ª in the transverse draft members 64 and 65, with consequent variation in the relation of the continuous flexible tread drive mechanism to the traction surface acted upon thereby and to the mass of the vehicle, any desired variation is attainable in respect of the depth of the bite of the crawler members in the ground, or in the direction of the draft upon the vehicle, thus affording compensation for different kinds of traction surfaces and plowing depths, and also allowing angular draft to overcome any tendency towards lateral movement of the vehicle under certain stresses such as may be met in working heavy soils upon sloping ground.

Having thus described my invention and illustrated its use, what I claim as new and desire to secure by Letters Patent is:

1. In an automotive vehicle, in combination, a continuous flexible tread traction device, a draw-bar, a transverse draft member, and means for varying the relation of the draw-bar and thence of the continuous flexible tread mechanism to said draft member whereby the relation of the continuous flexible tread mechanism to the body of the vehicle may be varied.

2. In an automotive vehicle, in combination, a continuous flexible tread traction device, a draw-bar, a divided transverse draft member, and means for varying the relation of the draw-bar and thence of the continuous flexible tread mechanism to said draft member whereby the relation of the continuous flexible tread mechanism to the body of the vehicle may be varied either longitudinally or laterally.

3. In an automotive vehicle, in combination, a continuous flexible tread traction device, a draw-bar, a divided transverse draft member, and means for varying the relation of the draw-bar and thence of the continuous flexible tread mechanism to said draft member whereby the relation of the continuous flexible tread mechanism to the vehicle as a whole may be varied longitudinally and thereby the traction thereof on the traction surface varied in intensity.

4. In an automotive vehicle, in combination, a continuous flexible tread traction device, a draw-bar, a divided transverse draft member, and means for varying the relation of the draw-bar and thence of the continuous flexible tread mechanism to said draft member whereby the relation of the continuous flexible tread mechanism to the vehicle as a whole may be varied laterally and thereby the traction thereof on the traction surface varied in its relation to the longitudinal axis of the vehicle.

5. In an automotive vehicle, in combination, a frame, a pair of spaced continuous flexible tread traction devices connected to said frame, a draw-bar disposed therebetween and means for connecting said draw-bar to the traction devices for imparting downward pressure to the traction devices relatively to said frame for increasing the tractive effort thereof.

6. In an automotive vehicle, in combination, a pair of continuous flexible tread traction devices, a draw-bar connected directly to and disposed therebetween, and means for lifting each of said devices out of contact with the traction surface without disturbance of the draw-bar and independently of the other.

7. In an automotive vehicle, in combination, a pair of continuous flexible tread traction devices, a draw-bar disposed therebetween, a transverse draft member, and means for varying the relation of the draw-bar and thence of the continuous flexible tread mechanism to said draft member whereby the relation of the continuous flexible tread mechanism to the body of the vehicle as a whole may be varied.

8. In an automotive vehicle, in combination, a pair of continuous flexible tread traction devices, a draw-bar disposed therebetween, a transverse draft member, means for varying the relation of the draw-bar and thence of the continuous flexible tread mechanism to said draft member whereby the relation of the continuous flexible tread mechanism to the body of the vehicle as a whole may be varied, and means for lifting each of said devices out of contact with the traction surface independently of the other.

9. In an automotive vehicle, in combination, a pair of continuous vertically displaceable flexible tread traction devices, a draw-bar disposed between said traction devices and directly connected thereto and exerting a downward pressure thereon, an independent pair of supporting links for each of said traction devices for permitting of said relative vertical displacement of the flexible tread devices.

10. In an automotive vehicle, in combination, a pair of continuous flexible tread traction devices, a draw-bar disposed therebetween, and independent pairs supporting links for the separate movement of said continuous flexible tread devices, the said draw-bar being slotted for the passage of the supporting means at one side of the continuous flexible tread mechanism.

11. In an automotive vehicle, in combination, a pair of continuous flexible tread traction devices, a draw-bar disposed therebetween, and side and central links for supporting said tread devices at each of their respective sides and also centrally, the draw-bar being connected to the central links.

12. In an automotive vehicle, in combination, a pair of continuous flexible tread traction devices, a draw-bar disposed therebetween, and links for supporting said continuous flexible tread mechanism at each side, a central support for said mechanism, said draw-bar being slotted for the passage of the central support.

13. In an automotive vehicle, in combination, a continuous flexible tread traction device and links at the opposite ends thereof for the swinging suspension of such device from the vehicle whereby the position of the device relatively to the vehicle chassis may be varied and thereby the proportion of the weight of the vehicle borne by the continuous flexible tread device and the traction thereof on the traction surface may be correspondingly varied without substantially varying the parallelism of the continuous flexible tread device to said vehicle and traction surface, the links at one end being slotted to compensate for the change in parallelism of such links as the continuous flexible tread device swings.

14. In an automotive vehicle, in combination, a pair of continuous flexible tread traction devices, a draw-bar disposed therebetween, a transverse draft member, means for varying the relation of the draw-bar and thence of the continuous flexible tread mechanism to said draft member whereby the relation of the continuous flexible tread mechanism to the chassis of the vehicle may be varied, and means for driving each of the continuous flexible tread devices independently of the other.

15. In an automotive vehicle, in combination, a pair of continuous flexible tread traction devices, side and central links for supporting said tread devices at each of their respective sides and also centrally, and draft mechanism connected to said central links and exerting a downward pressure on the traction devices.

In testimony whereof, I have hereunto signed my name.

PETER JACOB LYBACK.